United States Patent
Waldspurger et al.

(10) Patent No.: US 11,656,982 B2
(45) Date of Patent: May 23, 2023

(54) JUST-IN-TIME VIRTUAL PER-VM SWAP SPACE

(71) Applicant: Nutanix, Inc., San Jose, CA (US)

(72) Inventors: Carl Alan Waldspurger, Palo Alto, CA (US); Felipe Franciosi, Cambridge (GB); Florian Anselm Johannes Schmidt, Cambridge (GB)

(73) Assignee: Nutanix, Inc., San Jose, CA (US)

( * ) Notice: Subject to any disclaimer, the term of this patent is extended or adjusted under 35 U.S.C. 154(b) by 127 days.

(21) Appl. No.: 17/150,395

(22) Filed: Jan. 15, 2021

(65) Prior Publication Data
US 2022/0229774 A1 Jul. 21, 2022

(51) Int. Cl.
G06F 12/02 (2006.01)
G06F 12/0882 (2016.01)
G06F 12/0873 (2016.01)

(52) U.S. Cl.
CPC ...... *G06F 12/0246* (2013.01); *G06F 12/0873* (2013.01); *G06F 12/0882* (2013.01); *G06F 2212/7201* (2013.01)

(58) Field of Classification Search
CPC ............ G06F 12/0246; G06F 12/0873; G06F 12/0882; G06F 2212/7201
See application file for complete search history.

(56) References Cited

U.S. PATENT DOCUMENTS

| | | | |
|---|---|---|---|
| 7,512,769 B1 * | 3/2009 | Lowell | G06F 9/4856 711/165 |
| 7,624,240 B1 | 11/2009 | Colbert et al. | |
| 8,549,518 B1 | 10/2013 | Aron et al. | |
| 8,601,202 B1 * | 12/2013 | Melcher | G11C 16/349 711/159 |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,087,021 B2 | 7/2015 | Magenheimer et al. | |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Prasith Thammavong
(74) *Attorney, Agent, or Firm* — Foley & Lardner LLP

(57) ABSTRACT

Various embodiments disclosed herein are related to a non-transitory computer readable storage medium. In some embodiments, the medium includes instructions stored thereon that, when executed by a processor, cause the processor to send an indication of a first storage location to a destination host. In some embodiments, the first storage location includes content that is swapped out from a memory location in a source host. In some embodiments, the indication includes one or more of a logical address and a first physical address. In some embodiments, the medium includes instructions stored thereon that, when executed by a processor, cause the processor to map the logical address of the first storage location to a second physical address of a second storage location. In some embodiments, the destination host accesses the content of the first storage location.

22 Claims, 3 Drawing Sheets

(56) References Cited

U.S. PATENT DOCUMENTS

| | | | |
|---|---|---|---|
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 9,785,451 B1* | 10/2017 | Arroyo | G06F 9/45533 |
| 10,235,083 B1* | 3/2019 | Vora | G06F 3/0647 |
| 2011/0119427 A1* | 5/2011 | Dow | G06F 9/5088 718/1 |
| 2015/0370700 A1* | 12/2015 | Sabol | G06F 3/0679 711/103 |
| 2016/0266844 A1* | 9/2016 | Ogawa | G06F 12/0813 |
| 2016/0266923 A1* | 9/2016 | Miyoshi | G06F 3/0647 |
| 2016/0299774 A1 | 10/2016 | Reuther | |
| 2017/0272515 A1* | 9/2017 | Sanderson | H04L 67/1097 |
| 2018/0032360 A1* | 2/2018 | Agarwal | G06F 9/45558 |
| 2019/0391843 A1 | 12/2019 | Franciosi et al. | |
| 2020/0387405 A1* | 12/2020 | Xiao | G06F 12/109 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

"Eventfd(2)—Linux manual page"; Linux/UNIX system programming training; https://man7.org/linux/man-pages/man2/eventfd.2.html; Accessed on Jan. 13, 2021; pp. 1-6.

"Frontswap"; Linux Memory Management Documentation; https://www.kernel.org/doc/html/latest/vm/frontswap.html; Accessed on Jan. 13, 2021; pp. 1-9.

"Ioctl(2)—Linux manual page"; Linux/UNIX system programming training; https://man7.org/linux/man-pages/man2/ioctl.2.html; Accessed on Jan. 13, 2021; pp. 1-3.

\* cited by examiner

JUST-IN-TIME VIRTUAL PER-VM SWAP SPACE

BACKGROUND

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, the virtual machines may be migrated from one host machine to another host machine. Such migration may occur when the virtual machine is not in use. In some instances, live migration of a virtual machine that is in use is done by copying one or more of data or modifications to data stored in memory to the second host machine incrementally until a final data copy can be performed.

SUMMARY

Various embodiments disclosed herein are related to a non-transitory computer readable storage medium. In some embodiments, the medium includes instructions stored thereon that, when executed by a processor, cause the processor to send an indication of a first storage location to a destination host. In some embodiments, the first storage location includes content that is swapped out from a memory location in a source host. In some embodiments, the indication includes one or more of (a) a logical address of the first storage location that maps to a first physical address of the first storage location or (b) the first physical address. In some embodiments, the medium includes instructions stored thereon that, when executed by a processor, cause the processor to map the logical address of the first storage location to a second physical address of a second storage location. In some embodiments, the destination host accesses the content of the first storage location.

In some embodiments, an apparatus includes a processor and a memory. In some embodiments, the memory includes programmed instructions that, when executed by the processor, cause the apparatus to send an indication of a first storage location to a destination host. In some embodiments, the first storage location includes content that is swapped out from a memory location in a source host. In some embodiments, the indication includes one or more of (a) a logical address of the first storage location that maps to a first physical address of the first storage location or (b) the first physical address. In some embodiments, the memory includes programmed instructions that, when executed by the processor, cause the apparatus to map the logical address of the first storage location to a second physical address of a second storage location. In some embodiments, the destination host accesses the content of the first storage location.

In some embodiments, a method includes sending an indication of a first storage location to a destination host. In some embodiments, the first storage location includes content that is swapped out from a memory location in a source host. In some embodiments, the indication includes one or more of (a) a logical address of the first storage location that maps to a first physical address of the first storage location or (b) the first physical address. In some embodiments, the method includes mapping the logical address of the first storage location to a second physical address of a second storage location. In some embodiments, the destination host accesses the content of the first storage location.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
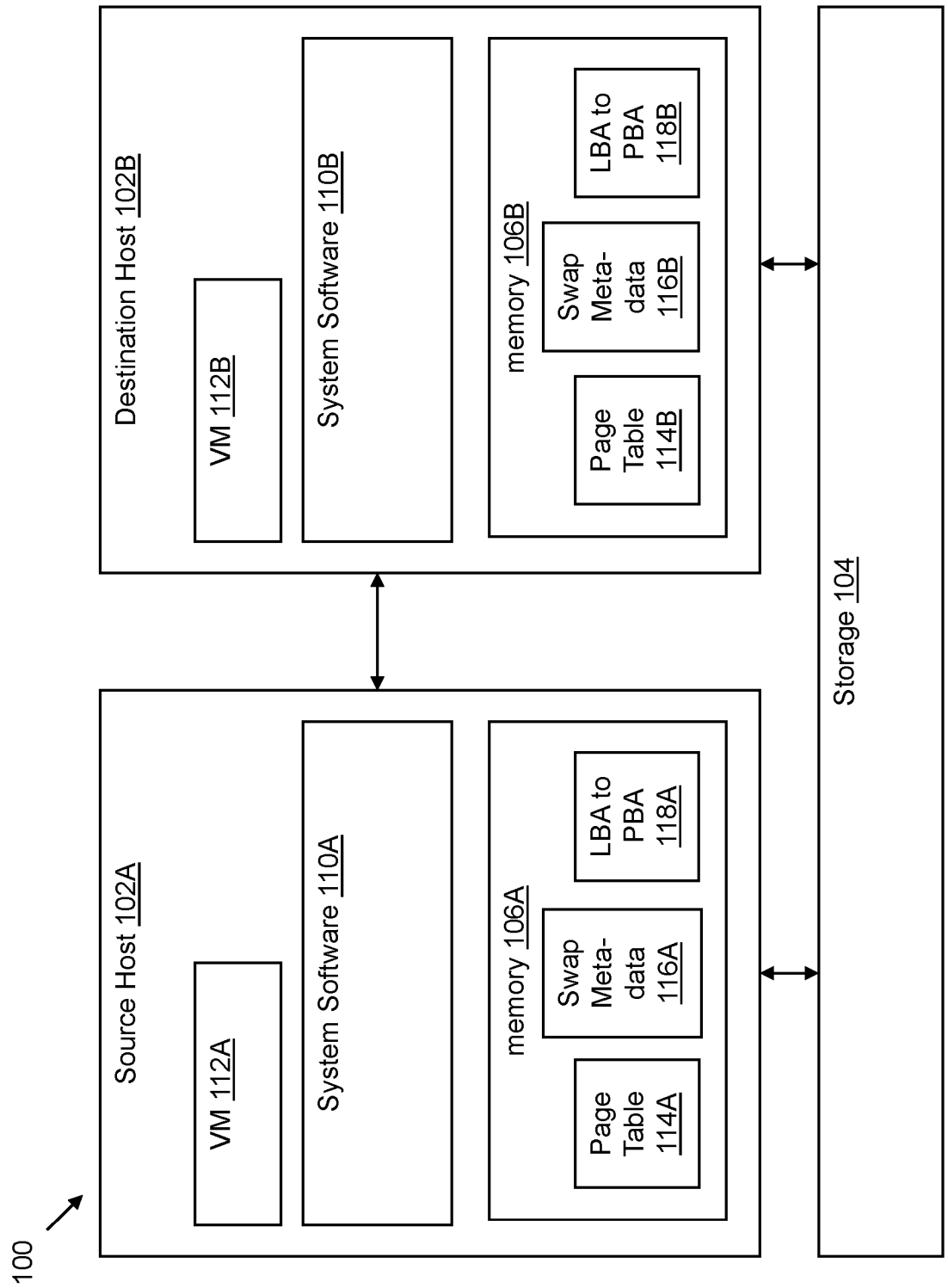
FIG. 1 is an example block diagram of a virtual environment for a just-in-time virtual per-virtual machine (VM) swap space, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Hypervisors and operating systems may implement demand paging to support virtual memory. In some embodiments, virtual memory provides an illusion of more random-access memory (RAM) than is physically available. When memory is overcommitted, the operating system may reclaim pages resident in RAM, swapping out the contents of the RAM to slower disk storage, from which the contents can later be read on demand if needed.

In some embodiments, an operating system (e.g., kernel, base kernel, host operating system) swaps memory into a common shared swap space associated with the physical host that the operating system manages. Pages from different entities such as virtual machines (VMs) and/or other non-VM processes running on the host may be mixed together in the same common swap space. In some embodiments, there is no support for using separate per-process or per-VM swap files or devices. Moreover, there may not be support for sharing the swap space across multiple hosts. In some embodiments, the swap space is associated with a single host and is managed exclusively by the operating system running on the host. A per-host swap space may be inefficient for live migration from a source host (e.g., source) to a destination host (e.g., destination). In some embodiments, any guest-physical pages which have been swapped to a disk on the source are first swapped back into RAM in order to send contents of the guest-physical pages to the destination. The contents of the guest-physical pages may induce additional swapping on the destination host. A more efficient approach may include leaving the contents of swapped-out pages in the swap area and sending the disk storage locations of these pages to the destination, which can fault them in on demand as needed.

To avoid using a per-host swap space, some virtualization systems not disclosed herein pre-allocate swap space on a per-VM basis and use per-VM swap files, which can be directly accessed by whichever host is currently running the VM. However, storage resources are inefficiently allocated as most of the space provisioned to accommodate a worst-case amount of memory that could be swapped for that VM may remain unused. In addition, adding support for per-VM swap space to the host operating system involves intrusive kernel modifications.

Disclosed herein are embodiments of a method for enabling efficient live migration of memory-overcommitted VMs without using intrusive kernel modifications. Embodiments of the disclosure are directed to optimizing live migration of memory-overcommitted VMs in a hypervisor such as a kernel-based hypervisor. Some embodiments of the disclosure are directed to the case where swapped pages correspond to guest-physical memory associated with a virtual machine (VM).

In some embodiments, a source host pre-copy migrates, to a destination host, contents of guest-physical pages that are not swapped out to a swap space. Swapped pages can be skipped during the pre-copy migration. The guest-physical to physical-swap-location mappings in the "virtual per-VM swap space" can be communicated to the destination as a separate section in the migration stream (or alternatively via some out-of-band mechanism). On the source host, in some embodiments, the logical addresses specifying the locations of the swapped-out pages are remapped to new physical swap-space locations so that the original physical swap-space locations are not rewritten before the destination host copies the contents of the original physical swap-space locations. The destination host may access the contents of the original swap-space locations using post-copy migration.

Advantageously, some embodiments disclosed herein create virtual per-VM swap space dynamically, containing only those guest-physical pages that were actually swapped out on the source host—constructed just-in-time during the migration itself. Using per-VM swap-space allocations need not be provisioned up-front. In some embodiments, sufficient space need only be provisioned for the expected aggregate amount of swap space statistically required for all VMs running on a host, which may commonly be considerably smaller than the simple sum of all per-VM requirements. Thus, some embodiments improve end-to-end live-migration performance while also reducing resource consumption. Another advantage is that the corresponding blocks in the source swap space are remapped to new blocks so that the swap space remains transparent to the source host. Accordingly, the source host can access the logical swap space locations (e.g., LBAs) that the source host previously used for migrating the VM's swapped guest physical pages without overwriting the original physical swap space locations because, according to the source host, the logical swap space locations refer to different physical swap space locations. Still another advantage is that everything can be implemented in user-space without requiring any kernel modifications.

FIG. 1 illustrates a block diagram of a virtual environment 100 environment for a just-in-time virtual per-virtual machine (VM) swap space, in accordance with some embodiments. The virtual environment 100 includes a source host (e.g., node, machine, computer) 102A, a destination host 102B coupled to the source host 102A, and a storage (e.g., swap space) 104 coupled to the source host 102A and the destination host 102B. In some embodiments, the source host 102A includes underlying hardware such as memory 106A, one or more physical disks, one or more input/output (I/O) devices, and one or more central processing units (CPUs). In some embodiments, the source host 102A includes system software (a bare-metal hypervisor, a hosted/kernel-based hypervisor, a host operating system such as Linux, a kernel, or a combination thereof) 110A, and a virtual machine (VM) (e.g., guest VM) 112A. In some embodiments, the source host 102A includes a host operating system (OS) separate from the system software 110A. In some embodiments, the memory 106A includes metadata such as one or more of a page table 114A or a logical block address (LBA)-to-physical block address (PBA) mapping table 118A. The destination host 102B may include similar components as the source host 102A. For example, the destination host 102B includes memory 106B, and a system software 110B. Likewise, the memory 106B may include one or more of a page table 114B or an LBA-to-PBA mapping table 118B.

The memory 106A may store contents (e.g., data) of non-swapped pages. The storage 104 may store contents of swapped pages. The system software 110A may virtualize the underlying resources for virtual machines such as the VM 112A. The system software 110A may enable use of loadable kernels. In some embodiments, each page table entry (PTE) of the page table 114A that corresponds to a guest physical page in the memory 106A (e.g., non-swapped guest physical page) specifies a physical address (e.g., in the memory 106A) for the non-swapped guest physical page. In some embodiments, each page entry of the page table 114A that corresponds to a guest physical page in the storage 104 (e.g., a swapped guest physical page) specifies a swap location (e.g., in the storage 104). In some embodiments, the page table 114A includes a present flag that indicates whether the corresponding guest physical page is in the memory 106A. In some embodiments, the memory 106A includes swap metadata 116A, which may include metadata for swap such as a bitmap indicating which pages are used/free and a mapping of a swap device number to its associated device. The page table 114A can specify a swap location that may be interpreted by the system software 110A using the swap metadata 116A.

In some embodiments, the source host 102A (e.g., the system software 110A) live-migrates a VM 112A on the source host 102A to the destination host 102B to generate a VM 112B on the destination host 102B. In some embodiments, the source host 102A uses pre-copy migration, modified to skip already-swapped guest physical pages. In some embodiments, the source host 102A identifies the swapped pages from a user-space migration process without any kernel modifications. In some embodiments, the host source 102A identifies the swapped pages using information in an interface for examining the page table 114A (e.g., Linux pagemap exposed via /proc/pid/pagemap or other interfaces not including Linux). In some embodiments, the host source 102A reads files in /proc to examine the page table 114A. The swapped pages can be skipped by explicitly removing the swapped pages from the dirty page set and marking the swapped pages as if they have already been sent from the source to the destination. In some embodiments, the guest physical page number and the swap location (e.g. a swap device identifier and a disk block offset in the storage 104) associated with each of these swapped pages are communicated to the destination host 102B. In some implementations, the source modifies the user-space migration code to send the swap locations inline incrementally (e.g., in place of the actual page contents). In some implementations, the source host 102A uses an out-of-band method to send the swap locations in a single batch after the pre-copy completes. In some embodiments, the source host 102A sends (e.g., provides) the page table 114A to the destination host 102B. Iterative pre-copy may continue until all non-swapped pages have been migrated.

In some embodiments, after the pre-copy of all non-swapped pages has completed, the source host 102A switches to using post-copy migration to handle the swapped pages remaining on the source host 102A. On the destination host, the swapped pages may be missing in the page table 114B mapping the VM memory. For example, page-table entries (PTEs) associated with the swapped pages are empty. In some embodiments, the destination host 102B uses a kernel interface (e.g., Linux userfaultfd interface or other interfaces not including Linux) to handle demand page faults for the missing pages. The kernel interface may allow on-demand paging from a user space and, more generally, allow the user space to take control of various memory page faults, something otherwise only the kernel code could do. To handle a fault to a page originally swapped by the source, the destination host 102B may look up (e.g., read, access) its swap location and read the page contents directly from the source swap space (e.g., the storage 104).

In some embodiments, using post-copy migration for the swapped pages includes a method for preventing the source host 102A from recycling the swap space for the missing pages before the swapped pages are accessed by the destination. A mapping (e.g., pre-migration mapping) of the swap-space locations (e.g., logical disk blocks to physical disk blocks) associated with the VM migration can be remapped for the source host (e.g., post-migration mapping). After the remapping, the destination host 102B may access the content of the swapped pages (e.g., the physical locations) that can be identified by the pre-migration mapping, that is, the original swap space locations (e.g., logical disk blocks), while on the source host, the same logical disk blocks refer to different physical locations on the disk in the post-migration mapping. In some embodiments, the source host 102A translates the LBAs to PBAs (using the pre-migration mapping) during migration and sends the PBAs to the destination host 102B. Additionally or alternatively, the destination host 102B may access the LBAs of the pre-migration mapping when accessing swap storage 104, and the destination host can 102B can fetch the corresponding PBAs from the pre-migration mapping to access the content of the swapped pages. In some embodiments, one or more of the system software 110A (e.g., a device mapper on, or coupled to, the system software 110A) can perform the remapping, e.g., by presenting a view of each swap block device to the host via a mapper (e.g., /dev/mapper, when using the Linux device-mapper (dm) framework, or other mappers not including Linux), backed by blocks in a somewhat-larger physical swap device. Additionally or alternatively, swap-space blocks can be remapped by interposing on (e.g., transforming) I/O (e.g., I/O requests, I/O traffic, etc.) sent to swap devices in the storage 104. For example, the storage 104 includes, or is coupled to, a disk controller that remaps the I/O.

The memory 106A and the memory 106B may include, but is not limited to (a) temporary memory device such as random access memory (RAM) or (b) non-volatile memory (WM, e.g., persistent memory) such as non-volatile dual in-line memory modules (NVDIMM), read only memory (ROM) device, any type of magnetic storage devices (e.g., hard disk, floppy disk, magnetic strips, etc.), optical disks (e.g., compact disk (CD), digital versatile disk (DVD), etc.), smart cards, solid state devices, etc.

The storage 104 may include, but is not limited to, NVM such as NVDIMM, storage devices, optical disks, smart cards, solid state devices, etc. The storage 104 can be shared with one or more host machines such as the source host 102A and the destination host 102B. In particular, both the system software 110A of the source host 102A and the system software 110B of the destination host 102B can have read and write access to the storage 104. The storage 104 can store data associated with the source host 102A and data associated with the destination host 102B. The data can include file systems, databases, computer programs, applications, etc. The storage 104 can also include the swapped out data from the memory 106A and the memory 106B of the source and destination hosts 102A and 102B, respectively. In some embodiments, the storage 104 may include swapped out memory data from the hosts 102A and 102B and metadata that includes information regarding the locations of the swapped-out memory data on the storage 104. In some such embodiments, the storage 104 can be partition of a larger storage device or pool. In some embodiments, the storage 104 is a network-attached-storage such as a storage array network (SAN).

Each of the components (e.g., elements, entities) of the virtual environment 100 (e.g., the source host 102A, the system software 110A, the memory 106A, the VM 112A, the destination host 102B, the system software 110B, the memory 106B, the VM 112B, and the storage 104), is implemented using hardware, software, or a combination of hardware or software, in one or more embodiments. One or more of the components of the virtual environment 100 may include a processor with instructions or may be an apparatus/device (e.g., server) including a processor with instructions, in some embodiments. In some embodiments, multiple components may be part of a same apparatus and/or share a same processor. Each of the components of the virtual environment 100 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

Figure 2:
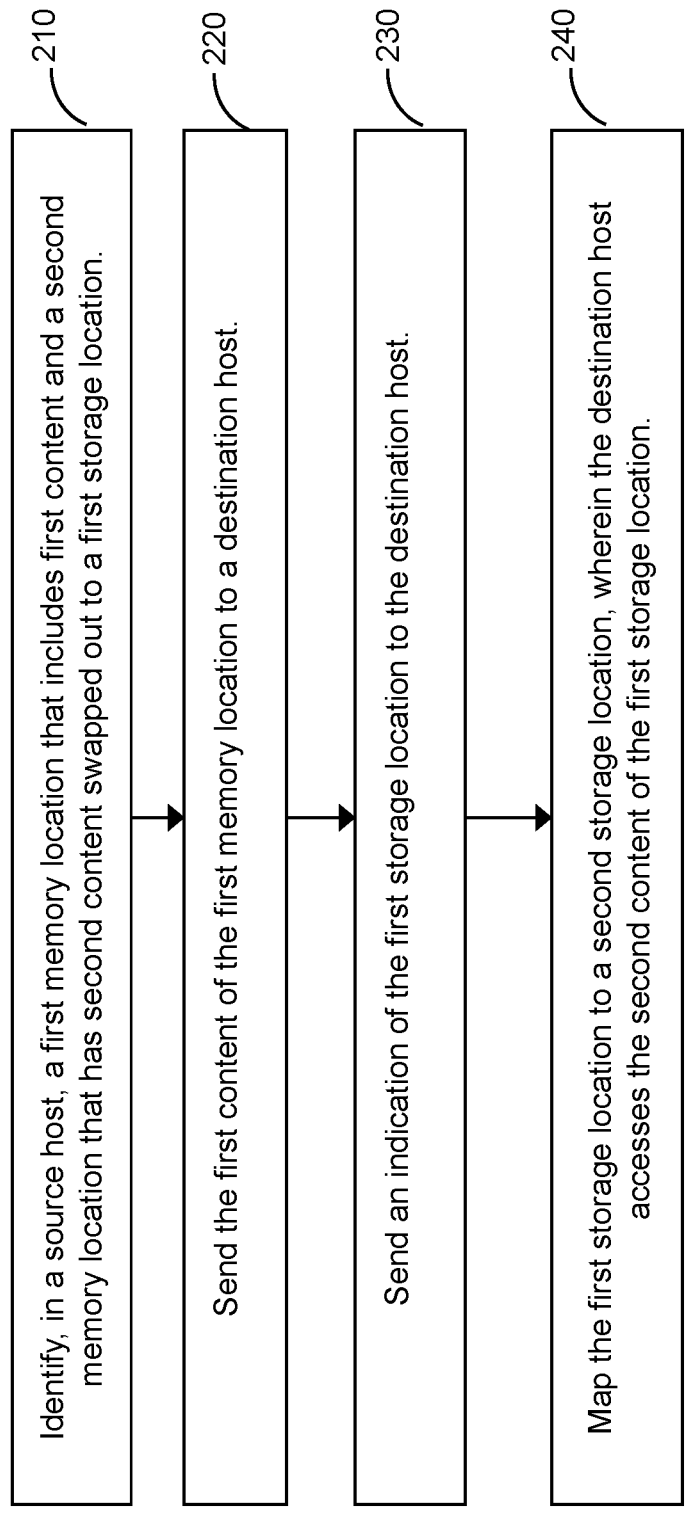
FIG. 2 is an example flowchart of a method, in accordance with some embodiments of the present disclosure.

Referring now to FIG. 2, a flowchart of an example method 200 is illustrated, in accordance with some embodiments of the present disclosure. The method 200 may be implemented using, or performed by, the virtual environment 100, one or more components of the virtual environment 100 (e.g., the source host 102A or the system software 110A), a processor associated with the virtual environment 100 or a processor of the one or more components of the virtual environment 100. Additional, fewer, or different operations may be performed in the method 200 depending on the embodiment.

A processor (e.g., the source host 102A, the system software 110A, or a combination thereof) identifies, in a source host (e.g., the source host 102A), a first memory location (e.g., a first guest physical page) that includes first content (e.g., data) and a second memory location (e.g., a second guest physical page) that has second content swapped out to a first storage location (e.g., a first block in the storage 104) (at operation 210).

The processor sends the first content of the first memory location to a destination host (e.g., the destination host 102B) (at operation 220). The processor sends an indication of the first storage location to the destination host (at operation 230). In some embodiments, the processor sends a physical address of the first storage location (e.g., PBA). In some embodiments, the processor sends a logical address of the first storage location (e.g., an LBA) that maps to the PBA according to the pre-migration view. The destination host can translate the LBA to the PBA before subsequent operations by the processor herein. In some embodiments, the source host sends, to the destination host, the first storage location incrementally in-line with the non-swapped pages (e.g., sends the guest physical page number, along with the associated PBA storing its swapped-out page contents in place of the page contents data itself). For example, the source host sends a swap location in place of an empty page entry. In some embodiments, the source host 102A sends, to the destination host 102B, the first storage location after sending the contents of all non-swapped pages.

In some embodiments, the processor maps the first storage location (e.g., the logical address of the first storage location) to a second storage location (e.g., a physical address of a second storage location, a second block in the storage 104) (at operation 240). In some embodiments, the processor remaps an LBA of the first storage location to a PBA of the second storage location in an LBA-to-PBA mapping table (e.g., the LBA-to-PBA mapping table 118A). In some embodiments, the processor remaps by presenting a view of each swap block device to the source host via a device mapper (e.g., /dev/mapper), backed by blocks in a somewhat-larger physical swap device. In some embodiments, the processor interposes on I/O sent to swap devices in storage (e.g., the storage 104). The interposition can remap the LBA of the first storage location to the PBA of the second storage location. In some embodiments, the destination host accesses the second content of the first storage location. In some embodiments, the source host writes to the second storage location without preventing the destination host from accessing the second content of the first storage location.

Figure 3:
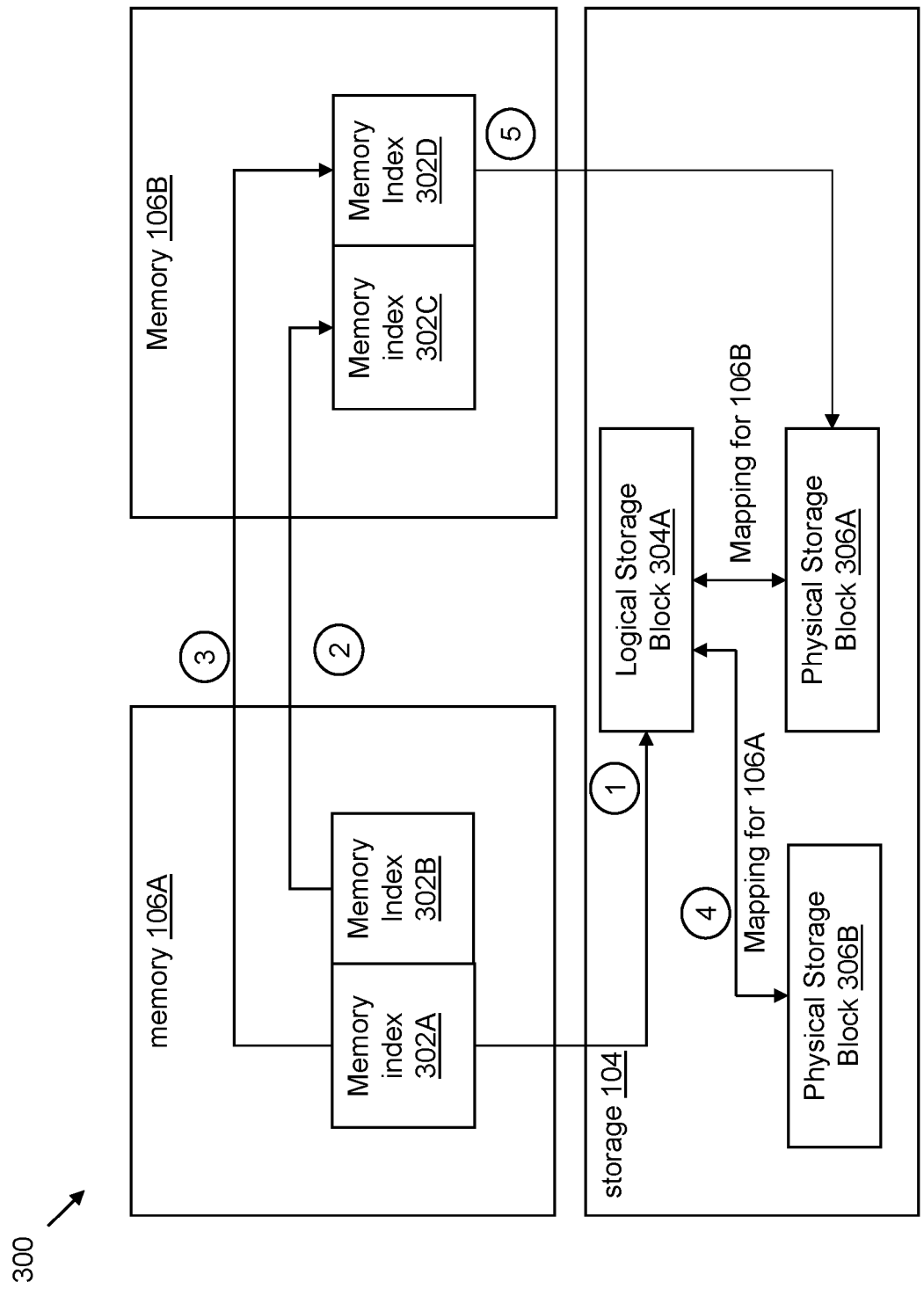
FIG. 3 illustrates an example VM migration in which swap-space locations associated with the migration are re-mapped in a manner that is transparent to the host, in accordance with some embodiments of the present disclosure.

By way of example, FIG. 3 illustrates an example VM migration in which swap-space locations associated with the migration are re-mapped in a manner that is transparent to the host, in accordance with some embodiments of the present disclosure. Content of a first memory location is sent to a memory location in a destination host. At operation 1, before VM migration begins, in some embodiments, content is swapped out of memory index 302A of the memory 106A into the storage 104 (e.g., physical storage block 306A) and the memory index 302A includes an address of a logical storage block 304A mapping to a physical storage block 306A in which the content is stored.

At operation 2, in some embodiments, VM migration begins by copying non-swapped out memory pages (e.g., in-memory content, content of memory indexes whose contents were not swapped out before migration) from the memory 106A (e.g., of the source host 102A) to the memory 106B (e.g., of the destination host 102B). For example, content of memory index 302B of the memory 106A is copied to the memory index 302C of the memory 106B.

At operation 3, in some embodiments, swapped out memory indexes (e.g., memory indexes whose contents were swapped out before migration) are copied over. For example, one of the address of the logical storage block 304A and the address of the physical storage block 306A is copied from the memory index 302A to memory index 302D. In some embodiments, the swapped-out pages are sent in-line with the non-swapped out pages. In some embodiments, the swapped-out pages are sent as a batch after the non-swapped out pages are sent. In some embodiments, the swapped-out pages are sent periodically during migration in batches of predetermined size. In some embodiments, content of an LBA-to-PBA mapping file is sent. Additionally or alternatively, the source host 102A copies or moves the LBA-to-PBA mapping file to a storage location on a network accessible by the destination host 102B and the source host 102A sends a reference (e.g., a network path name) to the LBA-to-PBA mapping file to the destination host 102B to enable the destination host 102B to read content of the LBA-to-PBA mapping file.

At operation 4, in some embodiments, for the source host 102A, the logical storage block 304A is remapped to physical storage block 306B. Note that, for the destination host 102B, the mapping may still from the logical storage block 304A to the physical storage block 306A.

At operation 5, in some embodiments, the destination host 102B looks up the content from the physical storage block 306A directly. For example, the destination host 102B may look up the content based on a page fault. Alternatively, the destination host 102B can look up the content using the address of the logical storage block 304A, which maps to the physical storage block 306A. Accordingly, the destination host 102B can read the content from the physical storage block 306A.

The systems and methods described provide advantages including a dynamically created virtual-VM swap space, containing only those guest-physical pages that were actually swapped out on the source host—constructed just-in-time during the migration itself. Advantages as compared to systems that use per-host swap space include a reduction in I/O and CPU cycle consumption. For example, for VM migration from one host to another, the source host can copy the storage locations of swapped pages to the destination host rather than swapping in the VM's contents to memory before copying. Advantages as compared to systems that use dedicated swap spaces is that content in the storage does not have to be copied. Rather, the content can be read directly from the shared storage.

Advantages as compared to systems that have actual per-VM swap files include a reduction in unused storage space that is reserved for swapping. For example, systems not using embodiments disclosed herein use actual per-VM swap files for each VM. In such embodiments, the actual per-VM swap files must be sized to accommodate a size of a logical memory partition for the VM less than a minimum reserved portion of physical space corresponding to the VM. The space pre-allocated to the per-VM swap file is likely to be largely unused during times of non-peak usage by applications on the VM. In contrast, in embodiments disclosed herein, the virtual per-VM swap space may be allocated on demand. After being used, the swap space can be freed up for other VMs. Moreover, adding support for actual per-VM swap space to the host operating system involves intrusive kernel modifications. In contrast, embodiments disclosed herein can be implemented in user-space such that patches in the kernel are not needed.

Another advantage as compared to embodiments not disclosed herein is that swapping on the destination host after a live migration is transparent to the source host. For example, the source host can write to the same logical disk block without overwriting the VM's content that the destination host is to read from the original physical location that the logical disk block maps to.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable storage medium comprising instructions stored thereon that, when executed by a processor, cause the processor to:
    send an indication of a first storage location to a destination physical host, wherein the first storage location includes content that is swapped out from a memory location in a source physical host different from the destination physical host, wherein the indication includes one or more of (a) a logical address of the first storage location that maps to a first physical address of the first storage location or (b) the first physical address; and
    map the logical address of the first storage location, for the source physical host, to a second physical address of a second storage location, wherein the logical address of the first storage location, for the destination physical host, maps to the first storage location, and wherein contents of the first storage location differ from contents of the second storage location,
    wherein the destination physical host accesses the content of the first storage location.

2. The medium of claim 1, wherein the destination physical host translates the logical address to the first physical address before the logical address is mapped to the second physical address.

3. The medium of claim 1, further comprising instructions stored thereon that, when executed by the processor, cause the processor to present a view of each swap block device to the source physical host via a device mapper.

4. The medium of claim 1, further comprising instructions stored thereon that, when executed by the processor, cause the processor to:
 interpose on input/output (I/O) sent to one or more swap devices to access the first storage location; and
 map the logical address to the second physical address using the interposition.

5. The medium of claim 1, further comprising instructions stored thereon that, when executed by the processor, cause the processor to send second content of a second memory location from the source physical host to the destination physical host.

6. The medium of claim 5, wherein the memory location is a first memory location, further comprising instructions stored thereon that, when executed by the processor, cause the processor to identify, in the source physical host, that the content of the first memory location is swapped out to the first storage location and that the second memory location includes the second content.

7. The medium of claim 1, further comprising instructions stored thereon that, when executed by the processor, cause the processor to send the first storage location in place of page content of the memory location.

8. The medium of claim 1, wherein mapping the logical address of the first storage location to the second physical address of the second storage location is in response to sending the indication of the first storage location to the destination physical host.

9. The medium of claim 1, wherein the source physical host has access to content of the second storage location via the logical address of the first storage location.

10. An apparatus comprising a processor and a memory, wherein the memory includes programmed instructions that, when executed by the processor, cause the apparatus to:
 send an indication of a first storage location to a destination physical host, wherein the first storage location includes content that is swapped out from a memory location in a source physical host different from the destination physical host, wherein the indication includes one or more of (a) a logical address of the first storage location that maps to a first physical address of the first storage location or (b) the first physical address; and
 map the logical address of the first storage location, for the source physical host, to a second physical address of a second storage location, wherein the logical address of the first storage location, for the destination physical host, maps to the first storage location, and wherein contents of the first storage location differ from contents of the second storage location,
 wherein the destination physical host accesses the content of the first storage location.

11. The apparatus of claim 10, wherein the destination physical host translates the logical address to the first physical address before the logical address is mapped to the second physical address.

12. The apparatus of claim 10, wherein the memory further includes programmed instructions that, when executed by the processor, cause the apparatus to present a view of each swap block device to the source physical host via a device mapper.

13. The apparatus of claim 10, wherein the memory further includes programmed instructions that, when executed by the processor, cause the apparatus to:
 interpose on input/output (I/O) sent to one or more swap devices to access the first storage location; and
 map the logical address to the second physical address using the interposition.

14. The apparatus of claim 10, wherein the memory further includes programmed instructions that, when executed by the processor, cause the apparatus to send second content of a second memory location from the source physical host to the destination physical host.

15. The apparatus of claim 14, wherein the memory further includes programmed instructions that, when executed by the processor, cause the apparatus to identify, in the source physical host, that the content of the first memory location is swapped out to the first storage location and that the second memory location includes the second content.

16. The apparatus of claim 10, wherein the memory further includes programmed instructions that, when executed by the processor, cause the apparatus to send the first storage location in place of page content of the memory location.

17. A computer-implemented method comprising:
 send an indication of a first storage location to a destination physical host, wherein the first storage location includes content that is swapped out from a memory location in a source physical host different from the destination physical host, wherein the indication includes one or more of (a) a logical address of the first storage location that maps to a first physical address of the first storage location or (b) the first physical address; and
 map the logical address of the first storage location, for the source physical host, to a second physical address of a second storage location, wherein the logical address of the first storage location, for the destination physical host, maps to the first storage location, and wherein contents of the first storage location differ from contents of the second storage location,
 wherein the destination physical host accesses the content of the first storage location.

18. The method of claim 17, wherein the destination physical host translates the logical address to the first physical address before the logical address is mapped to the second physical address.

19. The method of claim 17, further comprising presenting a view of each swap block device to the source physical host via a device mapper.

20. The method of claim 17, further comprising:
 interposing on input/output (I/O) sent to one or more swap devices to access the first storage location; and
 mapping the logical address to the second physical address using the interposition.

21. The method of claim 17, further comprising sending second content of a second memory location from the source physical host to the destination physical host.

22. The method of claim 21, further comprising identifying, in the source physical host, that the content of the first memory location is swapped out to the first storage location and that the second memory location includes the second content.

* * * * *